Patented July 2, 1929.

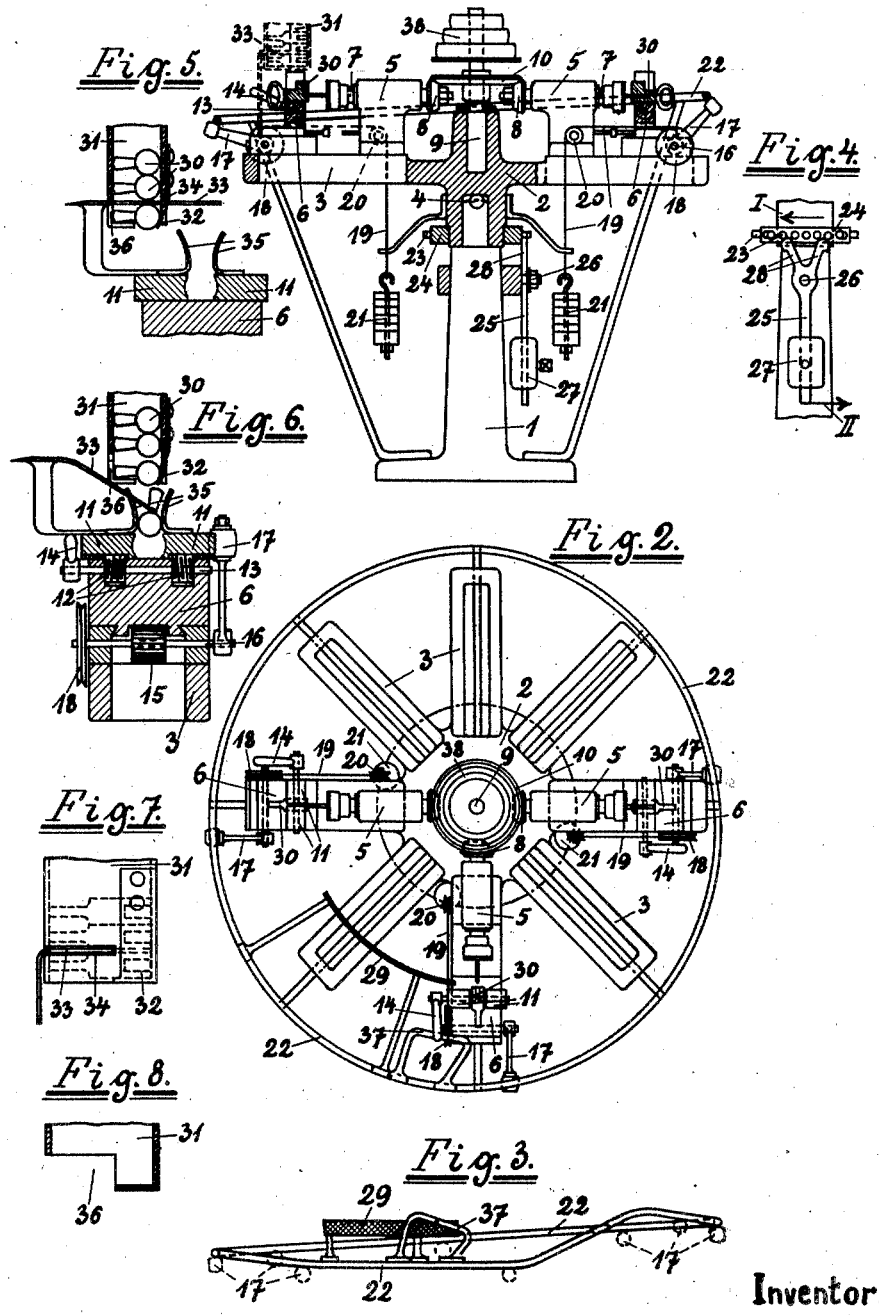

1,719,238

UNITED STATES PATENT OFFICE.

ERICH SANDER, OF GEVELSBERG, GERMANY.

DRILLING, MILLING, AND LIKE MACHINE.

Application filed November 26, 1927, Serial No. 235,909, and in Germany May 8, 1926.

My present invention relates to drilling, milling and like machines and more particularly to machines for drilling keys, wall-dowels and similar articles, milling surfaces and accomplishing other suitable works.

In the known machines for the above mentioned articles the cutter-bars together with the chucks are generally arranged side by side on a machine frame or body and the operator is obliged, for mounting the working pieces, to walk from one chuck to another, whereby very much time will be lost and the operator is not enabled to work more than four chucks. Moreover the continuous walking to and fro is very tiresome for the operator, as he will walk through a distance of about 15 kilometers in one work-day.

According to my present invention the spindle heads and chucks are arranged on a revolving plate or star-shaped frame, whereby the operator will be allowed to remain or sit on the same place, at the same time being enabled to work twice as many chucks as heretofore, with the result that the operator will produce much more work.

In the accompanying drawings, I have illustrated by way of example a machine for drilling keys. In these drawings:

Fig. 1 is a sectional elevation of the machine.

Fig. 2 is a top plan view of same, and

Figs. 3 to 8 show details of the machine.

Revolvably arranged on a frame 1 is a plate 2 provided, according to the drawings, with eight frame-shaped arms 3. The plate 2 is journaled on a ball 4 or on annular ball bearing in order to facilitate the rotation thereof.

Secured to the arms 3 are spindle-heads 5, whilst chucks 6 are slidably arranged thereon. The spindle-heads 5 are constructed in the well-known way, except that the spindles 7 thereof may be rotated by means of bevelled wheels 8, all the spindles being simultaneously rotated by means of a bevel-gear 10 rotatably arranged on the plate 2 by means of a shaft 9, which is actuated by means of a stepped pulley 38 through the agency of a single belt. In order to smooth the end parts of the articles such as for instance keys, a file of convenient length 29, which, according to the rotary motion of tool 6 with the gripping implements round the axis of the machine is curved into circular shape and rigidly secured on the machine, for instance to the guiding rail 22.

During the rotary motion of the tools 6 and of the gripped articles 30, the end parts of the latter are moved along the file 29 and pressed against the latter, whereby the end faces are smoothed. After the smoothing, when the article is out of contact with the file, the boring of the articles 30 begins. The file 29 must also be long enough for forming an uninterrupted ring after having been bent. If such an annular file is fixedly connected to the machine, a smoothing only of the article is obtained, without any drilling or boring of same.

The chucks 6 are constructed in the well known way, the jaws 11 thereof being opened and closed by means of worm-gears 12 and shaft 13 and lever 14, and shifted by means of a gear-wheel 15, a shaft 16, a lever 17 and a rope-pulley 18. Attached to each rope-pulley 18 is a rope 19 extending around a rope-pulley 20 and supporting a weight 21. Through the action of said weight 21 the chucks 6 will be pressed, that is shifted against the tools, drills, cutters and the like in the drilling, milling and like operations and withdrawn subsequently by means of the lever 17.

In the drilling operations it frequently happens that owing to porous places in the material and the like the chucks 6 together with the article to be drilled will be drawn forwardly stepwise by the weight 21, whereby the drills may be broken off. In order to avoid this objection, I have arranged a guide-rail 22 corresponding to the rotation or the shape respectively of the plate 2, the levers 17 sliding along and below said guide-rail, which according to the necessary feed of the chucks and the simultaneous rotation of the lever 17 forms an upwardly extending incline on about ¾ of its length, whilst the remaining ¼ of the length extends downwardly towards the end point as shown in Fig. 3. Owing to said guide-rails 22 the levers 17 and therefore the chucks 6 will be suitably guided, the same can no longer be pushed forwardly stepwise and damage to the drill will thus be securely avoided. The last ¼ end of the guide-rail 22 causes the levers 17 to be rotated downwardly and the chucks 6 to be again withdrawn.

Owing to the resistance caused by the drills, cutters and the like in the operation or opposed by the material of the articles being worked upon, the plate 2 together with the spindle-heads and chucks will be automatically rotated and the operator may remain or sit on the same place. However, if desired, the plate 2 may be actuated by a special driving device. In the case of big drills or heavy articles respectively, it may be that the plate 2 will be rotated too rapidly. In order to avoid this objection, I have provided a ring 24 having pins on its periphery and secured on the hub of the plate 2, and to the frame 1 I have attached or journaled a lever 25 by means of bolts 26, said lever supporting a weight 27, slidably arranged on said lever. Above the fulcrum the lever 25 is two-armed (see Fig. 4) and the two arms 28 thereof slide against the pins 23 on the ring 24. During the rotation of the plate 2 in the direction of the arrow I in Fig. 4, the lever 25 will be rotated in the direction of the arrow II, and the action of the weight 27 will result in a braking of the rotation of the plate 2. By adjusting the weight 27 I may increase or decrease the braking action on the plate 2, and by removing said weight, such braking action may be completely annihilated.

In order to automatically supply the articles, for instance keys 30, to the chucks, I have provided a fixed guiding gutter 31 above the chucks, said gutter being partially open and narrowed by a spring 32 in such a way that the working pieces, for instance keys 30, will be maintained therein (see Figs. 5 and 6). Arranged on each chuck 6 is a spring 33 curved as shown in Fig. 6 and the guiding gutter 31 is laterally provided with a slot 34 (Fig. 7). At the other side the gutter is provided with an aperture 36 (Fig. 8). The straight front end of spring 33 and slot 34 are disposed at the same height, so that during the rotary motion of the chucks, the spring 33 enters the slot 34, as shown in Fig. 7. Then it is dragged along the wall of the guiding slot 31 beneath same, and thereby it is stretched by the latter so that its curved shape (Fig. 6) is changed into a straight one (Fig. 5). In the position according to Fig. 6, the spring 33 is disengaged from the slot 34 and has assumed its curved form and position again after having supplied the lowermost article 30 into a fork 35 secured on the chuck 6, whence said article will drop between the jaws 11. In order to enable the spring 33 to re-assume its curved shape, the rear wall of the guiding gutter 31 is cut away below the spring as indicated at 36 in Figs. 5, 6 and 8. Previously the lever 14 of the chuck 6 will be pushed upwardly by a guide 37, see Figs. 2 and 3, whereby the jaws 11 will be opened and the tightened article 30 allowed to drop from the chuck. After another article has been dropped from the guiding gutter 31 between the jaws of the chuck, or after the manual insertion of an article and a continued rotation of the chuck with the plate 2, the lever 14 will be disengaged from the guide 37 and turned downwardly by a spring, a weight or in any other way, whereby the jaws 11 will be closed and the article tightened in the chuck.

The automatic article feeding device may also be constructed and arranged in any other suitable way.

Having now fully described my said invention, what I claim and desire to secure by Letters Patent, is:

1. A machine of the character described, comprising a rotatably mounted plate, a plurality of radially arranged horizontally disposed cutter bars and chucks on said plate, positive means for driving said cutter bars including a central drive shaft, a gear on said shaft, and coacting gears on the cutter bar spindles, said plate being automatically rotatable due to frictional resistance between the same and said cutter bars and chucks.

2. A machine of the character described comprising a rotatably mounted plate, a plurality of radially arranged cutter bars and chucks on said plate, positive driving means for driving said cutter bars, said means including a central drive shaft, a gear on said shaft, coacting gears on the cutter bar spindles, and an inclined circular guide rail for controlling the movement of said chucks, said plate being automatically rotatable due to frictional resistance between the same and said cutters and chucks.

3. A machine of the character described, comprising a rotatably mounted plate, a plurality of radially arranged cutter bars and chucks on said plate, positive driving means for driving said cutter bars, said means including a central drive shaft, a gear on said shaft, coacting gears on the cutter bar spindles, an inclined circular guide rail for the chucks, levers on the chucks adapted to move along said guide rail, means for causing the levers on the chucks to be rotated for opening the jaws of the chucks, and resilient means for closing the jaws after an article has been placed therebetween.

4. A machine of the character described comprising a rotatably mounted plate, a plurality of radially arranged cutter bars and chucks on said plate, positive means for driving said cutter bars, said plate being automatically rotatable due to frictional resistance between the same and said cutters and chucks, and a file fixed in the path of travel of the articles being worked upon.

In testimony whereof I have hereunto set my hand.

ERICH SANDER.